Oct. 12, 1937.   A. WRIGHT   2,095,303
FILTRATION OF SOLID BEARING LIQUIDS
Filed Oct. 6, 1934   2 Sheets-Sheet 1

INVENTOR
ARTHUR WRIGHT
BY
ATTORNEYS

Oct. 12, 1937.       A. WRIGHT       2,095,303
FILTRATION OF SOLID BEARING LIQUIDS
Filed Oct. 6, 1934       2 Sheets—Sheet 2
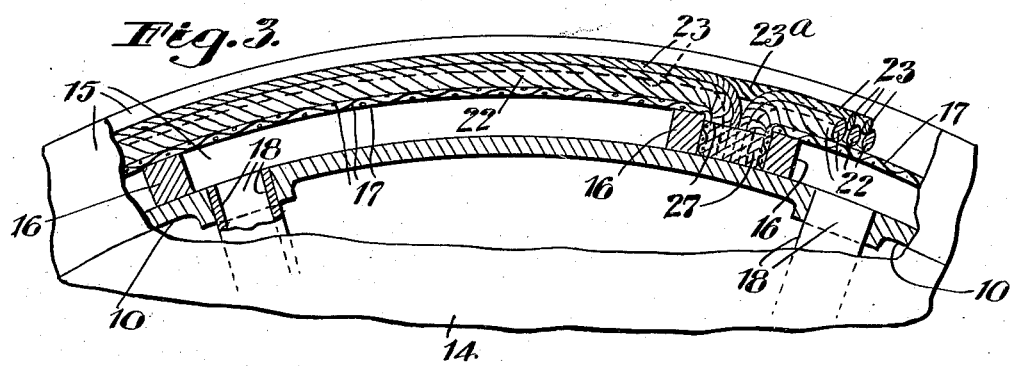
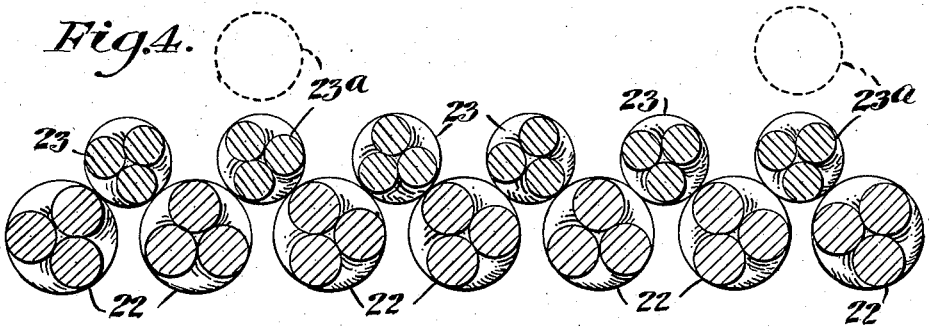
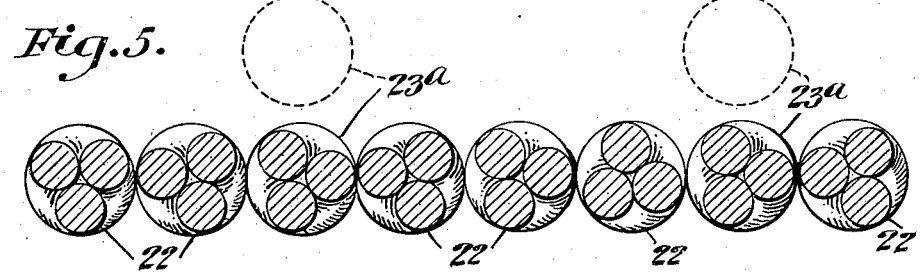
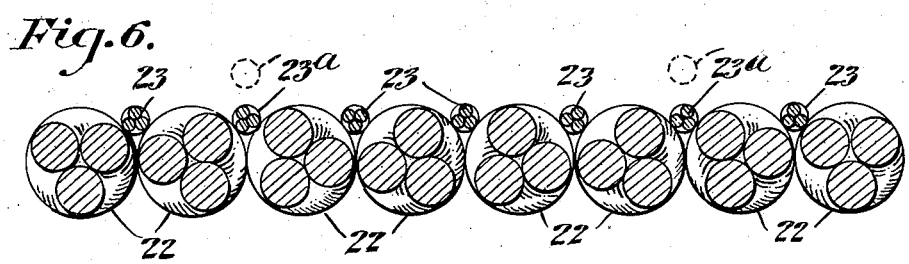
INVENTOR
ARTHUR WRIGHT
BY
ATTORNEYS Patented Oct. 12, 1937

2,095,303

UNITED STATES PATENT OFFICE 2,095,303

FILTRATION OF SOLID BEARING LIQUIDS

Arthur Wright, Upper Montclair, N. J.

Application October 6, 1934, Serial No. 747,137

8 Claims. (Cl. 210—201)

The invention relates to the filtration of solid-bearing liquids. In the continuous filtration of such liquids by means of rotary drum filters the solid constituents collect in the form of a filter cake on a filter medium which is carried by and encircles the drum, while the fluid constituents pass through the filter medium and are discharged. The accumulated solids forming the filter cake on the medium are discharged continuously at one point as the drum rotates. For efficient operation, complete removal of all filter cake should occur at the cake discharge point. Such complete removal of the cake is difficult to attain, particularly without the aid of cake removing means which act upon the filter medium in such manner as to cause injury thereto or cause rapid wear of the filter medium. It has been proposed to provide endless means extending around the filter drum over the top of the filter medium to become embedded in the cake and thus reinforce the filter cake, and to train said means away from the filter medium and drum at the cake discharge point to carry the cake away from the filter medium, and to detach the cake from the embedded reinforcing means at the discharge point. Such means are not efficient for removing very thin cakes from the filter medium because they require the building up of a cake which is more thick than the reinforcing means, and are further not efficient, even with thick cakes, because detachment of the cake from the completely embedded reinforcing means presents difficulties and results in injury to and rapid wear of the endless reinforcing means.

The present invention avoids these difficulties of known rotary filters by providing a rotary filter which has a self-cleaning or cake-discharging filter medium. The improved filter permits of the formation and discharge of the cake by a novel method or process, enables complete discharge of even extremely thin cakes to be effected, and is so constructed that wear and likelihood of damage to the filter medium are reduced to a minimum. The self-cleaning filter medium is also such that it may be made very strong and durable. This filter medium consists of textile threads, textile cords, wires, small metal or wire cords, or like filaments, all of which extend in the same direction around the drum, some of which cords are held to the drum to rotate therewith and others of which cords spaced apart longitudinally of the drum are endless cords and are trained outward away from the drum at the cake discharge point to discharge the cake.

In the drawings:

Fig. 3 is a fragmentary end view of the filter on an enlarged scale, a part of the drum being broken away;

Fig. 4 is a fragmentary sectional view of the filter medium shown in Figs. 1, 2 and 3, the section being taken longitudinally of the filter drum; and Figs. 5 and 6 are views similar to Fig. 4 showing two modified forms of the improved filter medium.

Figure 1:
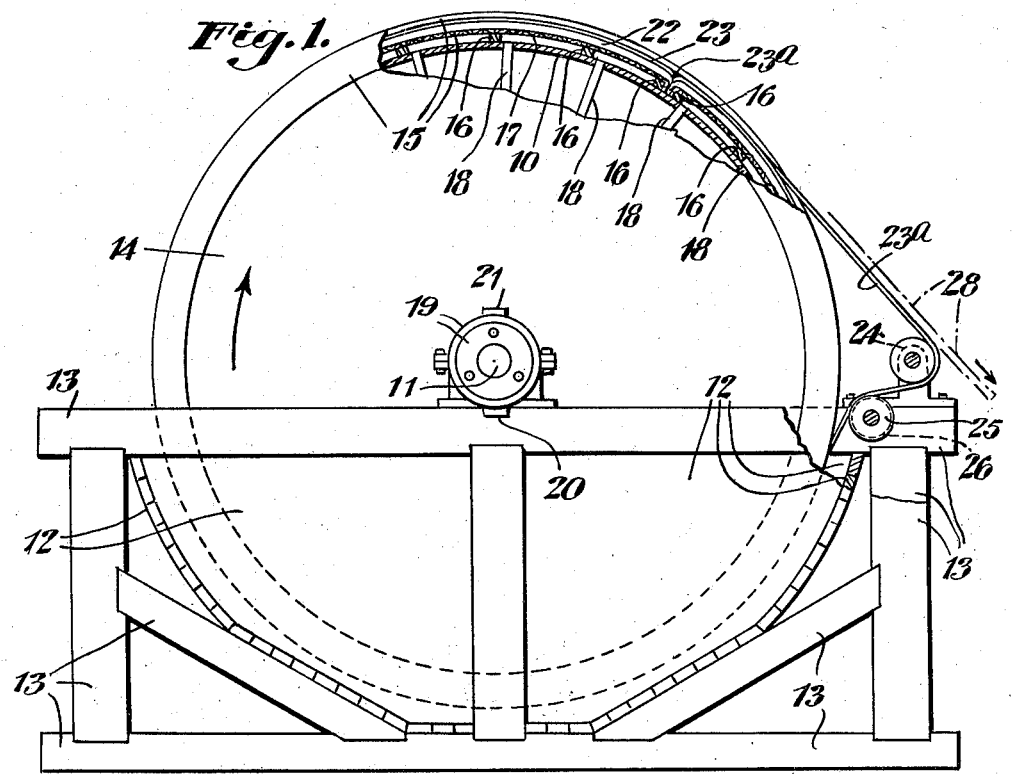
Fig. 1 is an end view of a continuous rotary filter of known kind provided with the improved self-cleaning or cake-discharging filter medium, a part of the drum and a part of the liquid tank being broken away.
Figure 2:
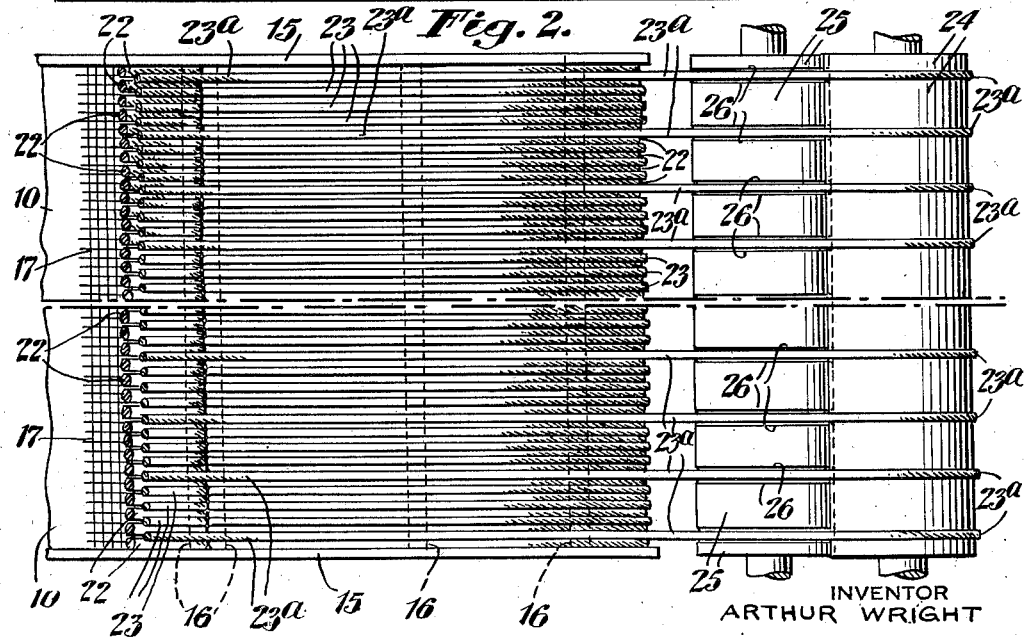
Fig. 2 is a fragmentary top plan view of the filter on an enlarged scale.

The filter shown is of the known rotary continuous filtering type wherein the filter drum 10 has an axle 11 which supports the drum to rotate with the lower part of the drum immersed in the solid-bearing liquid which is to be filtered, a supply of which liquid is maintained in the usual filter tank 12. The tank and drum are supported in a suitable frame 13, the lower part of the drum extending into the tank. The ends of the drum are closed by the usual drum heads 14, and the drum has the usual outwardly projecting end flanges 15 between which extend the usual bars or partitions 16 over the tops of which is stretched the usual coarse mesh wire screen 17 which encircles the drum to support the filter medium. From the usual filtrate or filtered liquid drainage chambers thus formed extend the usual drainage pipes 18 which lead to the usual valve 19 which, as the drum rotates, automatically connects the pipes 18 to a suction or vacuum port 20 of the valve except as the drainage chambers to which they are connected are traveling past the cake discharge point, when said valve connects the pipes to an atmospheric port or vent 21 of the valve to relieve the suction through the filter medium during the time the cake is being discharged from each successive portion of the rotating drum. Suction is maintained through port 20 by the usual pumping apparatus, not shown.

According to the present invention, in place of the usual woven fabric filter medium woven of textile or metal strands and supported on the wire screen 17, a self-cleaning or cake-discharging filter medium is provided, which filter medium will now be described. The improved filter medium consists of textile, metal or other cords or filaments all extending in the same direction around the drum, certain of which cords are held to the drum to rotate therewith and others of which cords are endless traveling cords.

As shown in Figs. 1 to 4, the filter medium consists of textile or metal cords 22, 23, and 23ᵃ each formed of twisted strands, the cords shown each consisting of three strands twisted together in the known manner to form the cords. These cords lie in parallel planes which are perpendicular to the axis of the drum. Cords 22 extend around the drum on screen 17 with the cords slightly spaced apart longitudinally of the drum. Cords 23 and 23ᵃ are of larger diameter than the spaces between cords 22. Cords 23 extend around the drum and each lies on two adjacent ones of the cords 22 to bridge the gap or space therebetween. The two ends of each cord 22 and each cord 23 are fixed to the drum in any suitable manner so that the cords 22 and 23 are fixedly related to each other and to the drum and rotate as a unit with the drum about the drum axis. Cords 23ᵃ are endless cords which are spaced apart at uniform intervals longitudinally of the drum to travel each on two of the cords 22 except at the cake discharge point or zone of the filter, where these endless cords are led outwardly from the drum over a guide roller 24 and then inwardly to the drum over a second guide roller 25, which latter roller preferably has a series of circumferential grooves 26 therein, one for each cord 23ᵃ, arranged to insure each cord 23ᵃ traveling in the plane of a selected one of the gaps or spaces between cords 22 not covered by a cord 23. The ends of cords 22 and 23, and of screen 17, are preferably secured to the drum, as shown, by being turned inward between two closely juxtaposed ones of the partitions 16 and embedded in a mass of suitable fluid proof cement 27 (Fig. 3). Rollers 24 and 25 have suitable axles journalled on the frame 13, and the filter drum is rotated in the direction of the arrow in Fig. 1. The rotation of the drum drives the endless cords 23ᵃ.

The cords 22, 23 and 23ᵃ form a filter medium which is effective to filter the solids from the liquid, except at the cake discharge point or zone at which no capacity for filtering action is required and suction through the medium is relieved. Said effectiveness for filtration is due to the fact that, while all the spaces between cords 22 are bridged by the outer cords 23 and 23ᵃ, except at the cake discharge zone, there nevertheless exists a multitude of minute passages for the passage of liquid free of solids through the medium, said passages resulting from the uneven or irregular contacting surfaces of the cords incident to the helical twisting together of the strands of which each cord is formed.

In Fig. 5 a modified form of filter medium is shown wherein fixed cords 22 and endless traveling cords 23ᵃ of the same size as cords 22 extend around the drum to form a filter medium consisting of a single layer of cords arranged side by side in contact, every fourth cord of the medium being one of the endless cords 23ᵃ.

In Fig. 6 a modified form of the two layer filter medium of Figs. 1 to 4 is shown, wherein all the fixed cords 22 contact each other, and the outer fixed cords 23 and endless cords 23ᵃ are of smaller diameter relatively to cords 22 than is the case with the filter medium shown in Figs. 1 to 4.

The modified filter mediums of Figs. 5 and 6 have a less uneven outer or cake-receiving surface than that of the medium of Figs. 1 to 4.

In the case of either of the three forms of filter medium, the number of cords 23ᵃ relatively to the number of remaining cords may be varied as desired. For example, in the forms shown in Figs. 4 and 6 every alternate one of the smaller or outermost cords may be an endless cord 23ᵃ, while in the form shown in Fig. 5 cords 22 and 23ᵃ may alternate with each other. Also, the drainage apertures may be provided in other ways than by using cords of twisted together strands, by employing other forms of filaments or wires with irregular surfaces, or by employing filaments having smooth surfaces which alternate with filaments having rough surfaces, or, with a medium of the kind shown in Fig. 5, by employing minutely spaced filaments having smooth surfaces.

The filaments may be waterproofed or proofed against corrosion, as may be desirable, before assembling them with the drum. Cords 22 and screen 17 may, if desired, be laid in a suitable sealing compound, such as plastic wood, where they pass over partitions 16, but this is not necessary in the improved filter.

In operation, the filter drum is rotated continuously in the direction of the arrow appearing in Fig. 1, suction being maintained through the filter medium except where the endless cords 23ᵃ are diverted from the drum over the guide rollers 24 and 25, suction being relieved on the portion of the medium where cords 23ᵃ are thus diverted. The solids accumulate as filter cake on the outer surface of that part of the filter medium which is subject to the suction, this cake being continuously lifted cleanly by the endless cords 23ᵃ away from the drum at the discharge point and dropping from the cords 23ᵃ as the latter pass down and under roller 24. A part of the cake at the discharge point is indicated by broken lines at 28 in Fig. 1. The cake discharges readily and cleanly from cords 23ᵃ, since the cords 23ᵃ forming parts of the improved self-cleaning or cake-discharging medium do not become completely embedded in the cake. The filtrate or filtered liquid passes through the filter medium and is drained through pipes 18 and valve 19 in the usual way, passing from valve 19 through the usual suction port 20 of the valve.

What I claim is:

1. A rotary filter having a filter drum, and a filter medium consisting of filaments all of which are arranged in parallel planes perpendicular to the drum axis, certain of which filaments are held to the drum to rotate therewith and are ineffective to form a filter, and the remainder of which filaments are endless filaments which complete the filter medium and are driven by rotation of the drum and guided to travel in a path which is displaced outwardly relatively to the path of the other filaments at a given point around the drum and then back to the drum to again complete the filter medium to thereby effect a continuous discharge of accumulated solids from the filter medium at said given point around the drum during operation of the rotary filter.

2. A rotary filter having a rotary drum, and a filter medium associated with said drum consisting of filaments extending around the drum axis and forming part way around the drum a filter medium with filtrate passages between the filaments, certain of said filaments being held to the drum to rotate therewith, and the remainder being endless filaments which are spaced at intervals longitudinally of the drum and are driven by rotation of the drum and are guided to travel in a path in which they are displaced outwardly relatively to the other filaments during rotation of the drum past a given point to discharge solids from the filter medium at said point.

3. A rotary drum filter according to claim 2, wherein the filaments each consist of strands twisted together.

4. A filter having a rotary filter drum, a filter medium comprising an inner and an outer series of parallel filaments extending around the drum axis, the inner series of filaments being held to the drum to rotate therewith and ineffective to form a complete filter medium, certain filaments of the outer series being held to the drum to rotate therewith and the remaining filaments of the outer series being interspersed with the other filaments of that series and being endless, all of said filaments of the inner and outer series forming the complete filter medium, and means guiding the endless filaments of the outer series outward away from the drum at a given point about the drum, said outward movement of said endless filaments rendering the filter medium ineffective as a filter over the area where said endless filaments are detachable from the other filaments, and each filament of the outer series, except said endless filaments where the latter are guided outward away from said drum, contacting two filaments of the inner series.

5. A rotary filter according to claim 4 wherein the filaments of at least one of said two series of filaments have irregular surfaces providing filtrate passages through the filter medium.

6. In a liquid filter of the kind having a rotative drum which receives the filtered liquid through its periphery during continuous rotation of the drum, the combination with the drum of a series of endless traveling elements unattached to each other and to the drum and extending about the periphery of the drum with said endless elements spaced apart axially of the drum too widely to effectively filter the liquid, and means associated with said series of endless elements to support and guide the said series of elements to travel about the drum axis in a fixed non-circular orbital path which is concentric with the drum axis part way about the axis and is displaced farther from the axis the remainder of the way about the axis, said last-mentioned means including means at the drum periphery ineffective to filter the liquid and fixed to the drum to travel constantly concentrically with the drum axis during continuous rotation of the drum and constructed and arranged to interfit with said series of endless elements to form with the latter effective means to filter the liquid and to so interfit with said series of endless elements only where the orbital path of the latter is closest to and concentric with the drum axis.

7. A liquid filter comprising, in combination, a filtered-liquid-collecting suction drum supported for rotative driving thereof about a substantially horizontal axis, means for maintaining about the lower portion of the drum a supply of liquid to be filtered, filter-cake-discharging liquid-filtering means driven about the drum axis from the drum during rotative driving of the drum and consisting of drum-held means held to the drum at the drum periphery to travel about the drum axis concentrically with said axis and of endless traveling means extending about the drum and unattached to the drum, and guiding means for said endless traveling means supported independently of the drum and located exteriorly of the drum periphery to guide said endless traveling means, during rotation of the drum, first outwardly from and then back toward the drum-held means where the drum periphery is above said maintained liquid supply to thereby effect discharge of filter cake, said endless traveling means being inset in said drum-held means about the drum periphery except where the former is diverted outwardly from the latter by said guide means and forming with the drum-held means a liquid-filtering means predetermined defined areas of which are rendered of coarser filtering capacity than the remainder by the diversion of the endless traveling means from inset relation with the drum-held means.

8. A liquid filter comprising in combination a suction drum supported for rotation about a horizontal axis, means for maintaining about the lower portion of the drum a supply of liquid to be filtered, a series of cake-discharging traveling elements spaced apart and unattached to the drum and extending about the periphery of the drum with said traveling elements spaced apart axially of the drum too widely to effectively filter the liquid, and means associated with said series of traveling elements to support and guide the said series of elements to travel in spaced relation about the drum axis in a fixed non-circular orbital path which is concentric with the drum axis part way about the axis and is displaced farther from the axis the remainder of the way about the axis and directed back to the drum periphery above the level of the liquid to be filtered, said last-mentioned means including means at the drum periphery spaced apart axially of the drum too widely to form a filter of the desired fineness to effectively filter the liquid and arranged to travel constantly with the drum during rotation of the drum and constructed and arranged in spaced relation to interfit with said series of spaced traveling elements to form with the latter the effective means of the desired area and fineness to filter the liquid and to so interfit with said series of traveling elements only where the orbital path of the latter is closest to and concentric with the drum axis, the separation and diversion of the traveling elements from the drum periphery rendering that portion of the drum inoperative as a filter of the desired fineness.

ARTHUR WRIGHT.